Patented Apr. 24, 1934

1,955,979

UNITED STATES PATENT OFFICE

1,955,979

METHOD OF ORE SEPARATION

Joseph P. Ruth, Jr. Denver, Colo., assignor to The Ruth Company, Denver, Colo., a corporation of Colorado No Drawing. Application August 23, 1932, Serial No. 630,094

3 Claims. (Cl. 209—167)

It is the object of this invention to produce an improved method for the promotion and flotation of any sulfide whose oxide, or a chemical compound of which, if precipitated on the surface of this sulfide to inhibit it, is soluble in a chemical compound that must be removed prior to the addition of a promoting chemical compound and before the flotation of this particular sulfide.

The following is an example of this discovery: An ore containing lead sulfide, zinc sulfide and iron pyrite is properly inhibited by a chemical such as cyanide or zinc cyanide formed with the cyanide and the zinc sulfate inherently in the ore, or formed by zinc cyanide made and added to the ore in the correct quantity. If zinc cyanide is used it effectively inhibits both zinc sulfide and iron pyrite, but this has no effect whatever on the flotation of lead which floats promptly and easily as soon as subjected to the flotation treatment in the presence of a frother and a satisfactory promoter. After the lead has been removed, the next step is to filter the pulp for the purpose of removing the cyanides. The ore is now repulped with fresh water, after which it is conditioned with copper sulfate which revivifies the zinc sulfide which can now be removed by froth flotation treatment, thus leaving the iron pyrite.

It has heretofore been customary to add the copper sulfate to promote the zinc sulfide while the cyanide was still present; this is a very difficult operation and unless the exact amount of copper sulfate is used, the iron pyrite will also be promoted and floated.

Adding cyanide in a satisfactory quantity; in most cases .2 pound of cyanide per ton of ore is ample to dissolve the zinc cyanide from the zinc sulfide particles. While this dissolving action is going on, the zinc cyanide which is made soluble and the straight cyanide which is present, are in no way promoters for iron pyrite, in fact they strongly tend to further inhibit the iron pyrite and at the same time cleanse the surface of the zinc particles. This property of cyanide is easily and readily recognized as being superior to copper sulfate for this purpose. Where cyanide is used to cleanse the zinc sulfide particles, however, it is not possible to use copper sulfate to promote the zinc without first removing the cyanide because the cyanide present in the solution interacts with the copper sulfate used to promote the zinc, resulting in a mixture that is deleterious to the flotation of zinc and which promotes the iron and makes it float with the zinc.

In accordance with my discovery cyanide, preferably straight cyanide, is added to the ore pulp for the purpose of cleaning the zinc sulfide particles. After the ore has been subjected to a conditioning period with cyanide, it is subjected to froth flotation for the purpose of removing the lead sulfide. The ore pulp is now filtered for the purpose of removing all of the soluble cyanides and the zinc cyanide which has been formed from the interaction of the cyanide and the zinc sulfate inherently in the ore. After the pulp has been filtered, it is repulped with fresh water and conditioned with copper sulfate which now serves to promote the flotation of the zinc sulfide. A suitable flotation promoter such as "sodium aerofloat" and a frother, such as cresylic acid, is now added and the pulp subjected to froth flotation whereupon the zinc sulfide is removed practically free from iron.

What I claim is:

1. In the flotation process for the differential separation of lead sulfide, zinc sulfide and iron sulfide, the step of inhibiting the zinc sulfide and iron pyrite by zinc cyanide, floating to remove the lead sulfide, filtering to remove the soluble product so formed, repulping and adding copper sulfate to promote the zinc, and floating the zinc.

2. A method for the differential separation of complex sulfide ores of which an ore containing lead sulfide, zinc sulfide and iron pyrite is an example which comprises, adding cyanide to clean the zinc sulfide particles, floating to removed the lead sulfide, filtering to remove all of the soluble cyanide and also the zinc cyanide which has been formed from the zinc sulfide, repulping the ore with fresh water, adding copper sulfate to revivify the zinc sulfide, adding a promoter and a frother and subjecting to froth flotation separation whereby the zinc sulfide will be floated practically free from iron.

3. In the froth flotation process for the differential separation of zinc sulfide from other sulfides, the steps of inhibiting the zinc sulfide with cyanide, subjecting to a froth flotation treatment for the removal of other sulfides that have not been inhibited, filtering to remove the cyanide and cyanide compounds formed, repulping with fresh water, adding copper sulfate to revivify the zinc sulfide and subjecting the pulp to froth flotation separation whereby the zinc sulfide will be removed.

JOSEPH P. RUTH, Jr.